Nov. 28, 1967 H. HEUER 3,355,577

ELECTROMECHANICAL COUNTING CHAIN ARRANGEMENT

Filed Sept. 24, 1963 3 Sheets-Sheet 1

Fig. I

INVENTOR
Hans Heuer
BY:
Michael J. Striker
ATTORNEY

Nov. 28, 1967 H. HEUER 3,355,577

ELECTROMECHANICAL COUNTING CHAIN ARRANGEMENT

Filed Sept. 24, 1963 3 Sheets-Sheet 2

INVENTOR
Hans Heuer
BY: Michael S. Striker
ATTORNEY

INVENTOR
Hans Heuer
BY: Michael J. Striker
ATTORNEY

United States Patent Office 3,355,577

Patented Nov. 28, 1967

3,355,577
ELECTROMECHANICAL COUNTING CHAIN ARRANGEMENT

Hans Heuer, Wilhelmshaven, Germany, assignor to Olympia Werke A.G., Wilhelmshaven, Germany Filed Sept. 24, 1963, Ser. No. 311,027
Claims priority, application Germany, Oct. 26, 1962, O 9,042
4 Claims. (Cl. 235—92)

ABSTRACT OF THE DISCLOSURE

An electromechanical counting arrangement formed by a number of sequentially interconnected bistable circuits. Each bistable circuit has an electromechanical relay operating a number of switching contacts. One of these switching contacts serves as a holding contact for the relay when it is actuated through the discharge of a capacitor. Another one of the switching contacts of each relay serves to actuate the subsequent and consecutive stage. Periodic actuation of the first stage causes the subsequent stages to interact so as to provide, at any instant, the count of the number of times that the first stage has been actuated. The stages may be cascaded in the form of a matrix to actuate controlling equipment at specific instants of the corresponding to a particular count or status of the counter arrangement.

Figure 1:
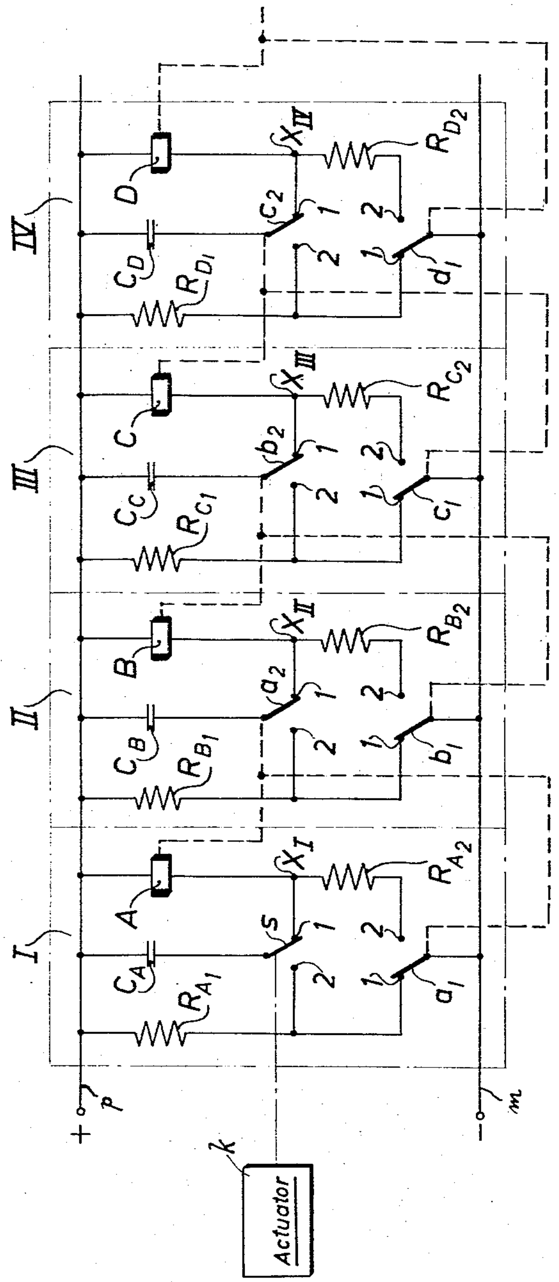

The present invention concerns a switching or counting chain composed of a series of frequency dividing, bistable stages.

Switching or counting chains composed of frequency dividing, bistable stages are known and are used for processing rapid impulse sequences, but the bistable elements of such known chains are constructed as flip-flop circuits. Such circuits involve a rather great number of comparatively expensive components e.g. transistors, precision resistors and capacitors. In those cases where such switching or counting chains are to be used in connection with a frequency that must be precisely maintained constant, the requirement for using precision components is even increased because otherwise a precise and constant switching frequency cannot be obtained.

However, it has been found that not always rapid switching and a rapid sequence of switchings is necessary. For instance, in connection with mechanically operating devices or in arrangements which are keyboard operated it is sufficient to use counting or switching operations which take place at a comparatively low frequency.

It is therefore one object of this invention to provide for a counting chain including a series of consecutive bistable, frequency dividing switching stages and suitable for cooperation with comparatively slowly operating data processing devices e.g. mechanical calculators equipped with means for electrical data input and output.

It is another object of this invention to provide for a counting chain of the type set forth which does not require electronic circuits.

It is still another object of this invention to provide for a counting chain as mentioned above which is composed of as small a number of components as possible and which requires comparatively little space.

It is still another object of this invention to provide for a counting chain as mentioned above which is easily adaptable for different operative requirements and which is entirely reliable in operaiton.

With above objects in view, the invention includes an electromechanical counting chain arrangement, comprising, in combination, a source of direct current, a series of consecutive bistable frequency dividing switching stages, each stage comprising: a first change-over switch changeable between a normal first position and a second position and operable at a first predetermined frequency characteristic of the particular stage, a second change-over switch changeable between a normal first position and a second position and operable at a predetermined second frequency twice that which is characteristic of the particular stage, capacitor means connected between the terminals of the source through the first and second change-over switches in such a manner that the capacitor means is charged when the first change-over switch is in its normal first position and the second change-over switch is in its second position, relay means including a relay coil for moving when energized the first change-over switch from the normal first position to its second position, the relay coil being connected between one terminal of the source and the first and second change-over switches in such a manner that it is energizable by discharge of the capacitor means when the second change-over switch means is in its normal first position and is held in energized condition when the first and second change-over switches are in their second positions, respectively, and actuating means operating in the stages the respective second change-over switches at the predetermined second frequency twice that which is characteristic of the particular stage, whereby in each stage the relay means is periodically energized at a first predetermined frequency characteristic of the particular stage when the second change-over switch of this particular stage is operated at the predetermined second frequency twice the first frequency.

As can be seen the individual stage of the counting chain according to the invention is composed of only a few comparatively simple and inexpensive elements. It is an advantageous characteristic of this arrangement that each stage requires only a single connection with one of the terminals of the source of electric energy. Most important, the invention shows that it is possible to produce with an ordinary relay effects which are otherwise known to be obtainable only by means of a flip-flop circuit.

In a preferred embodiment of the invention the change-over switch which is actuated within the first stage of the chain at a predetermined frequency twice that which is characteristic of the first stage, is operatively connected with an outside independent actuator e.g. a suitable type of a relay, or it may be actuated mechanically by operative elements of a calculator or similar machine.

It should be noted that a counting chain according to the invention is well suited for being operated at a frequency predetermined to be within the range of ten to fifty counting steps per second.

Figure 2:
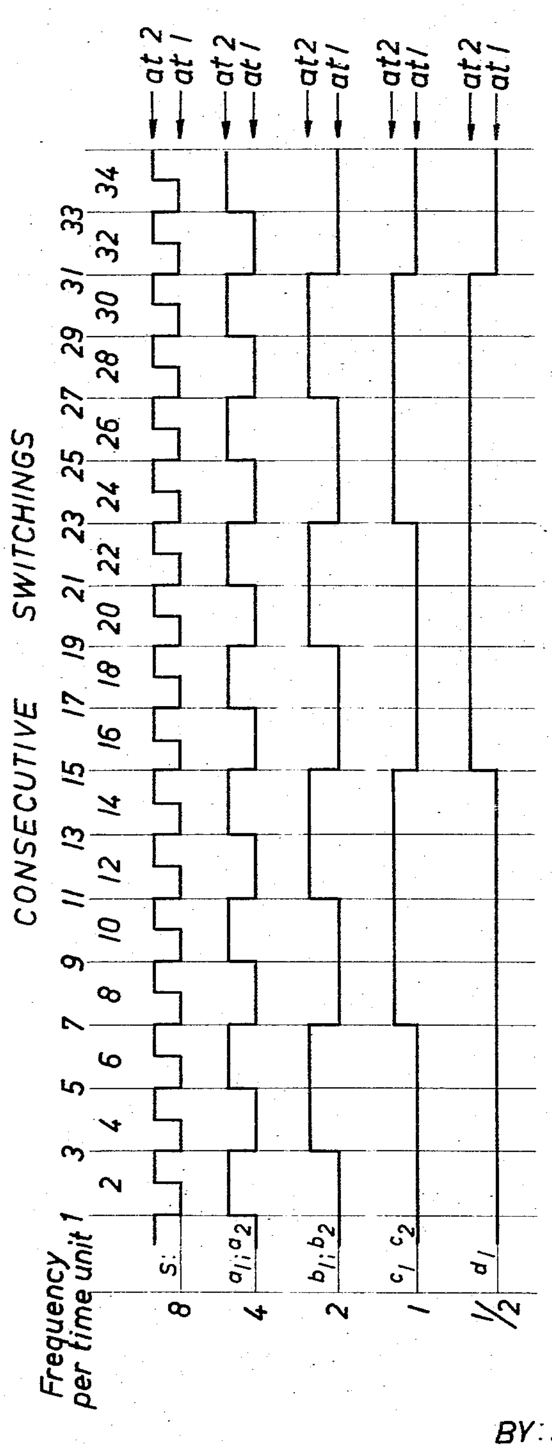
Figure 3:
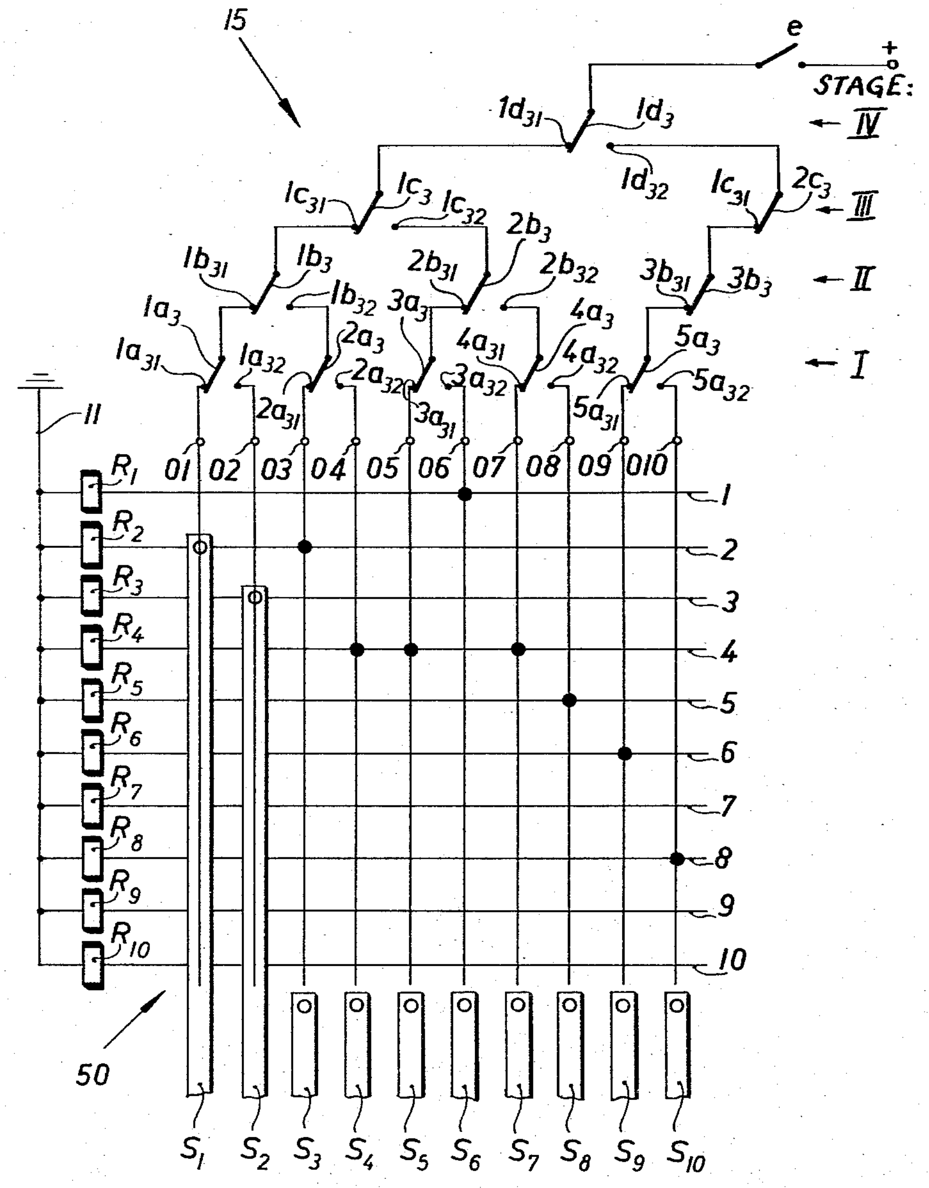

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic diagram illustrating a number of stages of a counting chain according to the invention;

FIG. 2 is a diagram illustrating the relations between the pulses appearing at different frequencies in the various stages of the arrangement of FIG. 1; and FIG. 3 is a schematic diagram illustrating an application of the invention, namely the use of a counting chain according to FIGS. 1 and 2 in connection with additional relay contacts shown only in FIG. 3 for the purpose of reading-out a matrix-type or cross bar distributor.

In FIG. 1 four stages in series-arrangement and marked I, II, III and IV, respectively, constitute a counting chain according to the invention. Each stage is substantially of the same construction as the other stages. Of course, a chain according to the invention may comprise fewer or more stages than the four stages illustrated and described.

In each stage there are connected between the positive supply line $p$ and the negative supply line $m$ coming from some source of direct current the coil A, B, C, D, respectively, of a relay and a capacitor $C_A$, $C_B$, $C_C$, $C_D$, respectively. One terminal of these capacitors is connected with the movable member $s$, $a_2$, $b_2$, $c_2$, respectively, of a change-over switch hereinafter called the second change-over switch, each of which comprises a normally engaged stationary contact 1 and a second stationary contact 2 to be engaged when the respective movable contact arm is moved to its second position. The stationary contacts 1 of these second change-over switches are connected respectively with the relay coil A, B, C, D, of the particular stage, the other terminal of each of these relay coils being connected with the positive line $p$. Consequently, when the movable contact of any one of the above mentioned second change-over switches is in its normal position engaging the stationary contact 1 thereof, then the respective relay coil is connected in series with the pertaining capacitor of the particular stage. This means that if the capacitor is in charged condition the discharge current of this capacitor will flow through the associated relay coil and energize the latter.

When the movable contact of any one of the change-over switches $s$, $a_2$, $b_2$ or $c_2$ is moved to its second position so as to engage the respective stationary contact 2, then a charging circuit between the lines $p$ and $m$ is established for the respective capacitor $C_A$, $C_B$, $C_C$, $C_D$ via the movable contact arm of the respectively associated first change-over switch $a_1$, $b_1$, $c_1$, $d_1$ of the particular stage while the particular first change-over switch is in its normal first position as illustrated. As can be seen, the movable arms of the above-mentioned first change-over switches are connected directly with the negative supply line $m$.

Each of the stages I–IV comprises also a resistor $R_{A1}$, $R_{B1}$, $R_{C1}$, $R_{D1}$, respectively, which serves for producing a complete discharge of the respectively associated capacitor after the latter has been discharged across the respectively associated relay coils and after the respective second change-over switch has been moved to its second position.

It can be seen further that the second stationary contact 2 of each of the first change-over switches $a_1$, $b_1$, $c_1$, $d_1$ is connected via a resistor $R_{A2}$, $R_{B2}$, $R_{C2}$, $R_{D2}$, respectively, with the relay coil of the particular stage. The movable contact arms of the first change-over switches $a_1$, $b_1$, $c_1$, $d_1$, are actually relay contacts and therefore movable between their first and second positions, depending upon the energization of the respectively associated relay coil A–D. Consequently, when any one of these relay coils is energized and the respectively associated first change-over switch is moved to its second position, a holding circuit for the particular relay is established and the particular relay coil is maintained in energized condition until the movable contact arm of the particular first change-over switch returns to its normal first position.

It is to be understood, as will be explained further below, that the relay coil of each stage will be energized and therefore the related first change-over switch will be actuated at a frequency which is characteristic of the particular stage. However, in each stage the second change-over switch will be operated at a second predetermined frequency which is twice that which is characteristic of the particular stage.

Means are provided for actuating in each stage the respective second change-over switch at said second frequency which is twice the frequency characteristic of the particular stage. This is done in the following manner. In the first stage, the second change-over switch $s$ is operatively connected with an outside independent actuator $k$ which is designed for, and capable of, actuating the change-over switch $s$ at a predetermined frequency which is twice that which is characteristic of, and predetermined for, the stage I. In the stages II, III, and IV, the second change-over switch $a_2$, $b_2$, $c_2$, respectively, is for this purpose a relay contact operated by the relay coil of the respective preceding stage A, B, C, respectively. Thus, for instance, the switch $a_2$ will be actuated in conjunction with the switch $a_1$ of stage I and at the same frequency as the latter, the switch $b_2$ of stage III will be operated in conjunction with the switch $b_1$ and at the same frequency as the latter, and the switch $c_2$ of stage IV will be operated in conjunction with switch $c_1$ of stage III and at the same frequency as the latter.

FIG. 2 illustrates in diagrammatic form the sequence of pulses appearing in the four stages of the chain according to FIG. 1 during its operation. The first line of the diagram illustrates the movements between first and second positions of the change-over switch $s$ operating at twice the characteristic stage frequency of stage I. The consecutive numbers 1–34 at the top of FIG. 2 are the sequential numbers of the consecutive switchings, i.e., changes between first and second positions of switch $s$. It has to be assumed that at the moment of switching 1 the movable switch arm of switch $s$ is moved into engagement with the stationary contact 1 after in its preceding position in engagement with the contact 2 the capacitor $C_A$ had been charged. Now, the discharge circuit of the capacitor $C_A$ is closed via $s$ and its contact 1 through the relay coil A so that the relay coil A is energized by the discharge of the capacitor $C_A$. Hereby the change-over switch $a_1$ in stage I and the change-over switch $a_2$ in stage II are moved to their second position. The relay coil A is maintained in energized condition through the holding circuit closed by the change-over switch $a_1$. The change of the switch $a_2$ to its second position causes the capacitor $C_B$ to be charged via switch $a_2$ in its second position and the switch $b_1$ still in its normal first position.

By the actuator $k$ the switch $s$ is periodically moved between a first and second position as illustrated by the first line of the diagram of FIG. 2. At the moment 2 the switch $s$ is moved into engagement with the stationary contact 2 whereby the capacitor $C_A$ is now fully discharged across resistor $R_{A1}$ while the first change-over switch of stage I is in its second position for keeping, as mentioned above, the relay coil A energized.

At the next following switching moment 3 the switch $s$ is returned to its first normal position in engagement with the stationary contact 1 thereof whereby the now discharged capacitor $C_A$ is connected in parallel with the relay coil A. Hereby, at least a portion of the current which holds relay coil A energized is diverted to the capacitor $C_A$ for at least partly charging the latter whereby the potential at the junction point $X_I$ drops sufficiently for causing the relay to drop off so that the relay contact or switch $a_1$ returns to its normal first position and thus interrupts the self-holding circuit of the relay coil A. Simultaneously, the change-over switch $a_2$ of stage II returns also to its normal first position and thus closes the energizing circuit for the relay coil B. The capacitor $C_B$ discharges across relay coil B so that the latter moves the change-over switches $b_1$, $b_2$ to their second positions whereafter the relay coil B is kept in energized condition by the change-over switch $b_1$ which is now in engagement with its stationary contact 2.

The movement of the change-over switch $b_2$ of stage III to its second position closes the charging circuit for the capacitor $C_C$ and the switch $c_1$ in its normal first position. Consequently now the capacitor $C_C$ is charged.

If now the change-over switch $s$ of stage I is again moved at the moment 4 into engagement with its stationary contact 2 the charging circuit for the capacitor $C_A$ of stage I is again closed so that this capacitor is charged again. When the switch $s$ again returns at the moment 5 to its first position in engagement with the stationary contact 1 thereof, the capacitor $C_A$ discharges across the relay coil A. The latter is energized and holds itself in energized condition through the switch $a_1$ moved to its second position. At the same time, the switch $a_2$ of stage II is moved to second position in engagement with its stationary contact 2. However, the capacitor $C_B$ cannot be charged because the switch $b_1$ is in its second position so as to maintain the coil B energized. At the following moment 6 the switch $s$ is again moved to its second position, however, this remains without any effect because the capacitor $C_A$ cannot be charged since the switch $a_1$ is in its second position.

At the next moment 7 the switch $s$ is again moved into its first position in engagement with stationary contact 1 whereby, as explained above, the potential at the junction point $X_I$ drops and causes the relay coil A to release the switch contacts $a_1$ and $a_2$ so that the latter return to their first position. Hereby, the self-holding circuit for the relay coil A is interrupted. The change-over switch $a_2$ of stage II causes the potential at the junction point $X_{II}$ to drop sufficiently for causing the relay coil B to release the associated relay contacts or switches $b_1$ and $b_2$. The switch $b_1$ returns to its normal first position and thus interrupts the self-holding circuit of the relay coil B of stage II. The switch $b_2$ of stage III in its first position causes the capacitor $C_C$ to discharge via the relay coil C of stage III. Consequently, the relay coil C is energized and maintains itself in this condition through the switch $c_1$ moved to its second position, while the related contact or switch $c_2$ of stage 4 is moved to its second position whereby the capacitor $C_D$ is charged via the switch $d_1$ being in its first position.

It will be understood that the above described operation repeats cyclically irrespective of the number of stages, as long as the switch $s$ of stage I is periodically moved between its first and second positions. In the diagram of FIG. 2 the changes of the switches $a_1$, $a_2$; $b_1$, $b_2$; $c_1$, $c_2$; and $d_1$, respectively between their first and second positions is illustrated in FIG. 2 in the second, third, fourth and fifth line of the diagram, respectively. From this diagram it can be seen clearly that the stages act as frequency dividers inasmuch as relay coil A is energized at a frequency characteristic of stage I, and which is one-half the frequency of the switchings of the switch $s$. The frequency of energization of the relay B is again one-half of the frequency of the energizations of the relay A, and so on. For instance, if one assumes that the frequency of switching the switch $d_1$ is equal to one-half as indicated at the left of FIG. 2, then the actuation of switch $c_1$ or energization of relay coil C occurs at a frequency equal to 1, the switch $b_1$ is actuated and coil B is energized at a frequency equal to 2, the switch $a_1$ is actuated and the coil A is energized at a frequency equal to 4, and finally the actuation of the switch $s$ of stage I produced by the actuator $k$ occurs at a frequency equal to 8.

FIG. 3 is intended to show how an embodiment of the invention according to FIG. 1 can be modified or supplemented in order to serve an extremely advantageous purpose in an application of the counting chain according to the invention to a matrix-type or cross bar distributor. FIG. 3 must be considered as an extension of FIG. 1 which shows four switching stages I–IV. The upper portion of FIG. 3 shows a cascade arrangement of a plurality of switches comprising four banks of switches, each assigned to a different one of the stages I–IV, as indicated in FIG. 3.

If the arrangement according to FIGS. 1 and 3 is intended to be used for counting through the range of decimal digits from 0 to 9 or from 1 to 10, then, as shown in FIG. 3, the bank assigned to stage I would have to comprise five change-over switches $1a_3$, $2a_3$, $3a_3$, $4a_3$ and $5a_3$ which are all operatively connected with the relay coil A so as to be moved between their first and second positions when relay A is energized. The stationary contacts of the change-over switches of stage I, namely $1a_{31}$, $1a_{32}$, $2a_{31}$, $2a_{32}$ . . . $5a_{32}$ constitute, or are connected with, output terminals O1, O2, O3, . . . O10, respectively, which, in turn, are connected with the vertical column or decade lines of a matrix 50.

The bank of change-over switches associated with stage II comprises, as shown in FIG. 3, three change-over switches $1b_3$, $2b_3$ and $3b_3$, the latter being without a second stationary contact. The change-over switches of the last-mentioned bank are operatively connected with relay coil B of FIG. 1 so as to be operated thereby. The stationary contacts $1b_{31}$ and $1b_{32}$ are connected with the movable members of the change-over switches $1a_3$ and $2a_3$, respectively. Similarly, the stationary contacts $2b_{31}$ and $2b_{32}$ of the switch $2b_3$ are connected with the movable members of the change-over switches $3a_3$ and $4a_3$, respectively. The only stationary contact $3b_{31}$ of the switch $3b_3$ is connected with the movable member of the change-over switch $5a_3$.

In the bank of switches associated with stage III two switches $1c_3$ and $2c_3$ are operatively connected for actuation with the relay coil C in FIG. 1 and cooperate with stationary contacts $1c_{31}$, $1c_{32}$ and $2c_{31}$, respectively, which are connected with the movable arms $1b_3$, $2b_3$ and $3b_3$, respectively, as illustrated in FIG. 3.

Finally, the bank associated with stage IV contains only one change-over switch $1d_3$ which is actuated by the relay coil D of FIG. 1 and cooperates with two stationary contacts $1d_{31}$ and $1d_{32}$ connected with the switches $1c_3$ and $2c_3$, respectively. The movable member of the switch $1d_3$ is connected with an input terminal carrying for instance positive potential via a main switch $e$.

Normally, all the switches of the cascade arrangement thereof illustrated in FIG. 3 are in the illustrated positions. Thus, upon closing of the main switch $e$ at the start of operation a circuit is established between the positive input terminal via switch $e$, switches $1d_3$, $1c_3$, $1b_3$ and $1a_3$ to the output terminal O1. If now the counting chain of FIG. 1 is put into operation in the manner described above, by the action of the actuator $k$ and in accordance with the impulse diagram of FIG. 2, first the relay coil A will be energized so that together with the change-over switches $a_1$ and $a_2$ also all the change-over switches $1a_3$ to $5a_3$ of the bank assigned to stage I in FIG. 3 are moved to their second position, respectively. Now, the positive potential from the source is applied to the output terminal O2.

At the moment 3 of FIG. 2 when all the switches $1a_3$ to $5a_3$ return, together with switches $a_1$, $a_2$ to their first positions all the switches $1b_3$ to $3b_3$ of the bank associated with stage II are moved to their second positions respectively. As can be seen from FIG. 3 now the output terminal O3 is connected with positive potential of the source because the switches $1c_3$ and $1d_3$ are still in their normal first position.

Upon the next movement of the switches $1a_3$ to $5a_3$ to their second position, positive potential is applied from the source to the output terminal O4 via switches $2a_3$ and $1b_3$. Upon the next change of position of switches $1a_3$ to $5a_3$ the switches $1b_3$ to $3b_3$ return to their first normal position and the switches $1c_3$ and $2c_3$ of the bank associated with stage III are moved to their second position. Now, the output terminal O5 is connected with positive potential.

Upon the next movement of the switches $1a_3$ to $5a_3$ to their second position the switches $1b_3$ to $3b_3$, $1c_3$ and $2c_3$ as well as $1d_3$ remain in their first position. Consequently now the output terminal O6 is connected with positive potential. Upon the next movement of the switches $1a_3$ to $5a_3$ to their normal first position, the switches $1b_3$ to $3b_3$ are moved to their second position. Consequently now the output terminal O7 is connected with positive potential via the switches $1d_3$, $1c_3$, $2b_3$, and $4a_3$.

It will be understood from the above that in a similar manner the switching of the cascade arrangement of switches is continued until all the output terminals O1 to O10 are consecutively connected once with the positive terminal of the source of electric energy.

As mentioned above and as illustrated by FIG. 3 the output terminals O1 to O10 may be connected with a matrix-type or cross bar distributor 50. In a well known manner the column lines of the distributor 50 connect the different terminals O1 to O10 with the slide members $S_1$ to $S_{10}$, respectively, which are movable in the direction of the matrix column. Depending upon their longitudinal adjustment or position the movable slide members are capable of establishing a conductive connection between the respectively associated column line and a selected one of the horizontal row lines 1 to 10, respectively. For instance, slides $S_1$ and $S_2$ are positioned for establishing connection between terminal O1 and row 2 and between terminal O2 and row 3, respectively. Other possible column-row connections are indicated by black dots at the respective crossing points.

The horizontal row lines 1 to 10 may be connected with relay coils $R_1$ to $R_{10}$, respectively, as shown. These relay coils may constitute part of any arrangement controllable thereby, e.g. for operating components of a typewriter, a calculator or of a similar machine.

After the slides $S_1$ to $S_{10}$ are positioned according to existing requirements, the operation of the counting chain according to the invention will apply to the matrix 50 readout pulses at a frequency ranging between 10 and 50 pulses per second whereby the relay coils $R_1$ to $R_{10}$ which are all connected with the negative terminal 11 of the source of energy, will be energized in the sequence predetermined by the setting or positioning of the slides $S_1$ to $S_{10}$.

It should be understood that FIG. 3, as far as the illustrated distributor 50 is concerned illustrates only one example of the applicability of the counting chain according to the invention. Those skilled in the art will understand readily that the counting chain according to the invention can be used in cooperation with many types of control devices which up to now had to be operated with the aid of rather complicated flip-flop counting chains or the like.

It will be understood that each of the elements described above, or two or more together, may also find a useful application in other types of electromechanical counting chain arrangement differing from the types described above.

While the invention has been illustrated and described as embodied in an electromechanical counting chain arrangement which is composed of stages comprising each a capacitor and two relay operated change-over switches, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic and specific aspects of this invention and therefore, such adaptations should and are intended to be comprehended within the meaning and range of equivalence of the following claims.

What is claimed as new and desired to be secured by Letters Patent is:

1. An electromechanical counting chain arrangement, comprising, in combination, a source of direct current;

a series of consecutive bistable frequency dividing switching stages, each stage comprising:

a first change-over switch changeable between a normal first position and a second position and operable at a first predetermined frequency characteristic of the particular stage, a second change-over switch changeable between a normal first position and a second position and operable at a predetermined second frequency twice that which is characteristic of the particular stage, capacitor means connected between the terminals of said source through said first and second change-over switches in such a manner that said capacitor means is charged when said first change-over switch is in its normal first position and said second change-over switch is in its second position, resistor means connected in series with said first change-over switch when in said normal first position and serving as a discharge resistor for said capacitor means when said second change-over switch is in the second position, a single relay including a single relay coil for moving when energized said first change-over switch from said normal first position to its second position, said relay coil being connected between one terminal of said source and said first and second change-over switches in such a manner that it is energizable by discharge of said capacitor means when said second change-over switch means is in its normal first position and is held in energized condition when said first and second change-over switches are in their second positions, respectively; and actuating means for operating in said stages the respective second change-over switches at said predetermined second frequency twice that which is characteristic of the particular stage, whereby in each stage said relay means is periodically energized at a first predetermined frequency characteristic of the particular stage when said second change-over switch of this particular stage is operated at said predetermined second frequency twice said first frequency.

2. An electromechanical counting chain arrangement comprising, in combination, a source of direct current;

a series of consecutive bistable frequency dividing switching stages, each stage comprising:

a first change-over switch changeable between a normal first position and a second position and operable at a first predetermined frequency characteristic of the particular stage, a second change-over switch changeable between a normal first position and a second position and operable at a predetermined second frequency twice that which is characteristic of the particular stage, capacitor means connected between the terminals of said source through said first and second change-over switches in such a manner that said capacitor means is charged when said first change-over switch is in its normal first position and said second change-over switch is in its second position, first resistor means connected in series with said first change-over switch when in said normal first position and serving as a discharge resistor for said capacitor means, a single relay including a single relay coil for moving when energized said first change-over switch from said normal first position to its second position, said relay coil being connected between one terminal of said source and said first and second change-over switches in such a manner that it is energizable by discharge of said capacitor means when said second change-over switch means is in its normal first position and is held in energized condition when said first and second change-over switches are in their second positions, respectively; and actuating means for operating in said stages the respective change-over switches at said predetermined second frequency twice that which is characteristic of the particular stage, said actuating means including an outside independent actuator means for operating the second change-over switch of the first one of said stages, whereby in each stage said relay means is periodically energized at a first predetermined frequency characteristic of the particular stage when said second change-over switch of this particular stage is operated at said predetermined second frequency twice said first frequency.

3. An electromechanical counting chain arrangement, comprising, in combination, a source of direct current;

a series of consecutive bistable frequency dividing switching stages, each stage comprising:

a first change-over switch changeable between a normal first position and a second position and operable at a first predetermined frequency characteristic of the particular stage, a second change-over switch changeable between a normal first position and a second position and operable at a predetermined second frequency twice that which is characteristic of the particular stage, capacitor means connected between the terminals of said source through said first and second change-over switches in such a manner that said capacitor means is charged when said first change-over switch is in its normal first position and said second change-over switch is in its second position, first resistor means connected in series with said first change-over switch when in said normal first position and serving as a discharge resistor for said capacitor means, a single relay including a single relay coil for moving when energized said first change-over switch from said normal first position to its second position, said relay coil being connected between one terminal of said source and said first and second change-over switches in such a manner that it is energizable by discharge of said capacitor means when said second change-over switch means is in its normal first position and is held in energized condition when said first and second change-over switches are in their second positions, respectively; and actuating means for operating in said stages the respective second change-over switches at said predetermined second frequency twice that which is characteristic of the particular stage, said actuating means including an outside independent actuator means for operating the second change-over switch at the first one of said stages, while in the second and remaining stages of said series thereof, said second change-over switch is arranged to be moved between said normal first position and its second position depending upon energization of the relay means of the respectively preceding stage, said relay means of the respectively preceding stages thus constituting the actuating means for the second change-over switches of the respectively following stages, whereby in each stage said relay means is periodically energized at a first predetermined frequency characteristic of the particular stage when said second change-over switch of this particular stage is operated at said predetermined second frequency twice said first frequency.

4. An arrangement as claimed in claim 1, wherein each of said relay means includes at least one auxiliary switch movable between a first and a second position depending upon energization of the respective relay coil, the number of said auxiliary switches per stage increasing from the last stage of said series thereof to a predetermined number of auxiliary switches in the first stage, said auxiliary switches of said consecutive stages being connected in cascade arrangement from stage to stage, said cascade arrangement having an input terminal connected with the auxiliary switch of said last stage, the auxiliary switches of said first stage being change-over switches having each two selectable output terminals which also constitute the output terminals of said cascade arrangement, each movable contact of each of said auxiliary switches in a particular stage being connected with a stationary contact of a different auxiliary switch in the next following stage, so that when said relay means in said series of stages are periodically energized at frequencies decreasing at the ratio 2:1 from stage to stage starting with the first stage, connection is established between said input terminal and one after the other of said output terminals sequentially.

References Cited

UNITED STATES PATENTS

| | | | |
|---|---|---|---|
| 2,972,089 | 2/1961 | Jackel | 317—140 |
| 3,108,206 | 10/1963 | Zuhlsdorf | 317—140 |

MAYNARD R. WILBUR, *Primary Examiner.*

G. J. MAIER, *Assistant Examiner.*